US011961443B2

(12) United States Patent
Lee et al.

(10) Patent No.: US 11,961,443 B2
(45) Date of Patent: Apr. 16, 2024

(54) DISPLAY DRIVING APPARATUS

(71) Applicant: LX Semicon Co., Ltd., Daejeon (KR)

(72) Inventors: Dong Hun Lee, Daejeon (KR); Won Kim, Daejeon (KR); Young Tae Kim, Daejeon (KR); Taiming Piao, Daejeon (KR); Chang Gi Min, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 18/084,353

(22) Filed: Dec. 19, 2022

(65) Prior Publication Data

US 2023/0206805 A1 Jun. 29, 2023

(30) Foreign Application Priority Data

Dec. 24, 2021 (KR) ........................ 10-2021-0187227

(51) Int. Cl.
*G09G 3/20* (2006.01)

(52) U.S. Cl.
CPC ....... *G09G 3/20* (2013.01); *G09G 2310/0291* (2013.01); *G09G 2310/0297* (2013.01); *G09G 2310/08* (2013.01); *G09G 2330/02* (2013.01)

(58) Field of Classification Search
CPC ............. G09G 3/20; G09G 2310/0291; G09G 2310/0297; G09G 2310/08; G09G 2330/02
See application file for complete search history.

(56) References Cited

U.S. PATENT DOCUMENTS

2012/0319770 A1* 12/2012 Hsu ...................... G09G 3/3688 330/75

FOREIGN PATENT DOCUMENTS

| | | |
|---|---|---|
| KR | 2012-0049702 A | 5/2012 |
| KR | 2016-0053051 A | 5/2016 |
| KR | 2021-0056970 A | 5/2021 |

* cited by examiner

*Primary Examiner* — Gerald Johnson
(74) *Attorney, Agent, or Firm* — POLSINELLI PC

(57) ABSTRACT

The present disclosure discloses a display driving apparatus. The display driving apparatus of the present disclosure may be configured to drive a source signal in a state optimized for a panel load of a display panel.

16 Claims, 3 Drawing Sheets

DISPLAY DRIVING APPARATUS

BACKGROUND

1. Technical Field

Various embodiments generally relate to a display driving apparatus, and more particularly, to a display driving apparatus which is improved to drive a source signal in a state optimized for a panel load of a display panel.

2. Related Art

A display driving apparatus is designed to drive a display panel in correspondence to display data, and may be generally fabricated as a driver integrated circuit to be mounted in a display system.

The display panel configured in the display system may have a variable amount of a panel load depending on a fabrication environment or a specification. The panel load means that the display panel acts as a load of the display driving apparatus.

Therefore, a change in an amount of a panel load of the display panel may change the slew rate of a source signal outputted from a display driving circuit and may affect the stabilization of the display system.

Accordingly, the display driving apparatus needs to be designed to be adapted for various panel loads.

SUMMARY

Various embodiments are directed to a display driving apparatus capable of driving a display panel with an amount of current appropriate for an amount of a panel load of the display panel.

In an embodiment, a display driving apparatus may include: an output buffer configured to output a source signal corresponding to display data to a display panel; and a panel load detection circuit configured to determine an amount of a panel load of the display panel to which the source signal is to be provided, and provide a control signal, wherein the output buffer outputs the source signal with an amount of current corresponding to the amount of the panel load, by the control signal.

In an embodiment, a display driving apparatus may include: an output buffer configured to output a source signal corresponding to display data to a display panel; a multiplexer configured to control an output path of the source signal; and a panel load detection circuit configured to determine an amount of a panel load of the display panel to which the source signal is to be provided, and provide a control signal, wherein the multiplexer outputs the source signal through the output path to have an amount of current corresponding to the amount of the panel load, by the control signal.

The embodiments of the present disclosure may control an amount of current of a source signal to be outputted from an output buffer, a source signal to be outputted from a multiplexer to a display panel or a source signal of each of the output buffer and the multiplexer in correspondence to an amount of a panel load of the display panel.

Therefore, the embodiments of the present disclosure may drive the display panel with an amount of current appropriate for an amount of a panel load of the display panel, and as a result, advantages are provided in that the slew rate of a source signal to be outputted from a display driving apparatus may be improved and the stabilization of a system is possible.

DETAILED DESCRIPTION

Figure 1:
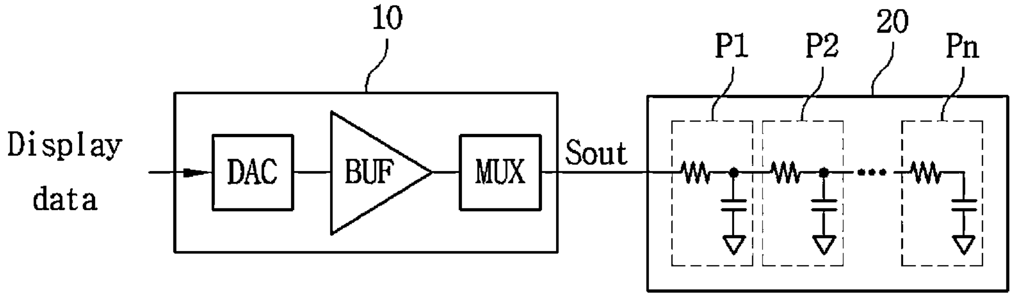
FIG. 1 is a block diagram illustrating an embodiment of a general display system.

In a display system illustrated in FIG. 1, a display driving apparatus 10 is configured to provide a source signal Sout corresponding to display data, to a display panel 20, and may be fabricated as a driver integrated circuit.

The display driving apparatus 10 may be configured to recover display data and a clock from a received packet and output the source signal Sout by using the recovered display data and clock. In FIG. 1, for the sake of convenience in explanation, the display driving apparatus 10 is illustrated as receiving display data instead of a packet.

The display driving apparatus 10 may be configured to include a clock data recoverer (not illustrated), latches (not illustrated), a digital-to-analog converter DAC, an output buffer BUF and a multiplexer MUX. In FIG. 1, in order for the description of an embodiment, the display driving apparatus 10 is illustrated as including the digital-to-analog converter DAC, the output buffer BUF and the multiplexer MUX among the above-described components.

Among the above-described components, the clock data recoverer may recover the display data and the clock from the packet, and the latches may align the display data in parallel using the clock.

The digital-to-analog converter DAC may be configured to receive the display data from the latches, select a gamma voltage corresponding to the display data and output an analog signal corresponding to the selected gamma voltage.

The output buffer BUF is configured to receive the analog signal corresponding to the display data from the digital-to-analog converter DAC and output the source signal Sout corresponding to the analog signal. It may be understood that the output buffer BUF performs a function of converting the analog signal generated in the digital-to-analog converter DAC into the source signal Sout of a level capable of being provided to the display panel 20.

The multiplexer MUX is configured to control an output path through which the source signal Sout is provided to the display panel 20. A column line of the display panel 20 to which the source signal Sout is provided may be periodically changed for the purpose of changing the polarities of pixels. To this end, the multiplexer MUX needs to be configured to periodically control the output path through which the source signal Sout is provided.

The source signal Sout is provided to each column line of the display panel 20. It may be understood that FIG. 1 illustrates that the display panel 20 includes a plurality of pixels P1, P2, . . . , Pn configured in one column line.

It may be illustrated that each of the pixels P1, P2, Pn of the display panel 20 serves as a load in which an equivalent resistor and an equivalent capacitor are combined.

An amount of a panel load of the display panel 20 may be determined by the loads of the pixels P1, P2, Pn described above.

An embodiment of the present disclosure is configured to determine an amount of a panel load of the display panel 20 and output the source signal Sout to have an amount of current changed depending on the amount of the panel load in correspondence to a determination result.

Figure 2:
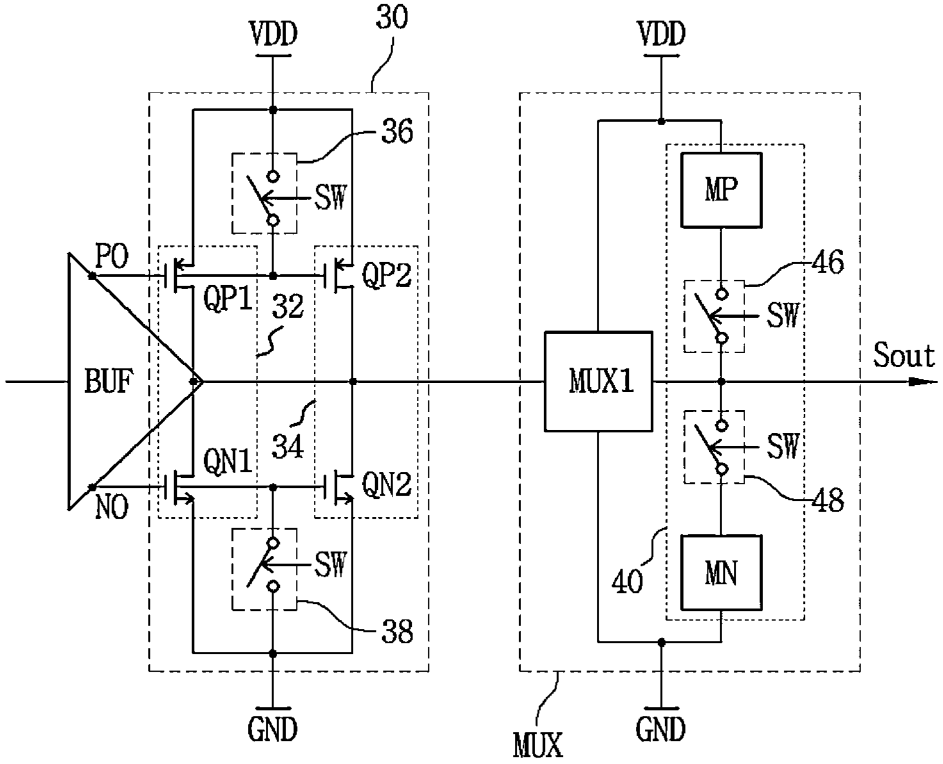
FIG. 2 is a circuit diagram illustrating an embodiment of a display driving apparatus of FIG. 1 in accordance with the present disclosure.

To this end, the output buffer BUF and the multiplexer MUX of FIG. 1 may be implemented as illustrated in FIG. 2. In order to determine an amount of a panel load of the display panel 20, a control signal SW may be provided by a panel load detection circuit 50 of FIG. 3. The panel load detection circuit 50 of FIG. 3 may be configured to provide the control signal SW which is generated by determining an amount of a panel load of the display panel 20 to which the source signal Sout is to be provided.

First, detailed configurations of the output buffer BUF and the multiplexer MUX will be described below with reference to FIG. 2.

The output buffer BUF may include an output circuit 30 which has a plurality of driving circuits. The plurality of driving circuits may be configured to be connected in parallel to an output terminal of the output buffer BUF and operate by output signals PO and NO which are driven inside the output buffer BUF. The output signal PO means a positive output signal which is driven inside the output buffer BUF, and the output signal NO means a negative output signal which is driven inside the output buffer BUF.

The output buffer BUF may be configured to output the source signal Sout by using driving circuits whose number is selected by the control signal SW.

In more detail, the output circuit 30 may include a first driving circuit 32 and a second driving circuit 34. The first driving circuit 32 and the second driving circuit 34 may be configured to be connected in parallel to the output terminal of the output buffer BUF, share the output signals PO and NO driven inside the output buffer BUF and operate by the output signals PO and NO.

In more detail, the first driving circuit 32 may be configured to include a PMOS transistor QP1 having a gate to which the output signal PO is applied and an NMOS transistor QN1 having a gate to which the output signal NO is applied. The PMOS transistor QP1 and the NMOS transistor QN1 may be configured to have a common drain, and the common drain of the PMOS transistor QP1 and the NMOS transistor QN1 may be connected to the output terminal of the output buffer BUF. An operating voltage VDD may be applied to a source of the PMOS transistor QP1, and a ground voltage GND may be applied to a source of the NMOS transistor QN1.

The second driving circuit 34 may be configured to include a PMOS transistor QP2 having a gate to which the output signal PO is applied and an NMOS transistor QN2 having a gate to which the output signal NO is applied. The PMOS transistor QP2 and the NMOS transistor QN2 may be configured to have a common drain, and the common drain of the PMOS transistor QP2 and the NMOS transistor QN2 may be connected to the output terminal of the output buffer BUF. That is to say, the second driving circuit 34 may be connected to the output terminal of the output buffer BUF in parallel with the first driving circuit 32. The operating voltage VDD may be applied to a source of the PMOS transistor QP2, and the ground voltage GND may be applied to a source of the NMOS transistor QN2.

The output circuit 30 may include a switching circuit which is switched by the control signal SW. The switching circuit may be configured to switch, by the control signal SW, that the output signals PO and NO are provided to the second driving circuit 34.

The switching circuit may include a switch 36 and a switch 38. The switch 36 is configured to switch that the operating voltage VDD is applied to the gate of the PMOS transistor QP2 of the second driving circuit 34. The PMOS transistor QP2 is turned off when the operating voltage VDD is applied to the gate, and the turn-off may be maintained regardless of the output signal PO. As a result, the switch 36 may switch that the output signal PO is provided to the PMOS transistor QP2. The switch 38 is configured to switch that the ground voltage GND is applied to the gate of the NMOS transistor QN2 of the second driving circuit 34. The NMOS transistor QN2 is turned off when the ground voltage GND is applied to the gate, and the turn-off may be maintained regardless of the output signal NO. As a result, the switch 38 may switch that the output signal NO is provided to the NMOS transistor QN2.

By the above configuration, the output circuit 30 may output the source signal Sout of an amount of current changed according to whether the second driving circuit 34 is operated by the control signal SW. The source signal Sout may be outputted to have a first amount of current by the first driving circuit 32 or a second amount of current by the first driving circuit 32 and the second driving circuit 34.

The multiplexer MUX may be configured to output, by the control signal SW, the source signal Sout through an output path to have an amount of current corresponding to an amount of a panel load.

To this end, the multiplexer MUX may include a selection circuit MUX1 and a current amount control circuit 40.

The selection circuit MUX1 is to control the output path of the source signal Sout, and may provide the output path for the source signal Sout by control. In order for driving the selection circuit MUX1, the operating voltage VDD and the ground voltage GND may be used.

The current amount control circuit 40 is configured to control, by the control signal SW, an amount of current of the source signal Sout which is outputted through the output path of the selection circuit MUX1.

To this end, the current amount control circuit 40 may include a positive driver MP, a negative driver MN and a switching circuit.

Each of the positive driver MP which is driven by the operating voltage VDD and the negative driver MN which is driven by the ground voltage GND may have a preset current driving capacity.

The switching circuit may be configured to switch, by the control signal SW, that the positive driver MP and the negative driver MN are connected to an output terminal of the selection circuit MUX1. To this end, the switching circuit may include a switch 46 and a switch 48. The switch 46 is configured to switch, by the control signal SW, that the positive driver MP provides a current to the output terminal of the selection circuit MUX1, and the switch 48 is configured to switch, by the control signal SW, that the negative driver MN provides a current to the output terminal of the selection circuit MUX1. In other words, when the switches 46 and 48 are turned off by the control signal SW, the current amount control circuit 40 does not provide a current to the output terminal of the selection circuit MUX1.

Therefore, the multiplexer MUX may be configured to output the source signal Sout of a first amount of current by the selection circuit MUX1 or a second amount of current by the selection circuit MUX1 and the current amount control circuit 40.

In the embodiment of the present disclosure configured as illustrated in FIG. 2, at least one of the output buffer BUF and the multiplexer MUX may be operated by the control signal SW to output the source signal Sout to have an amount of current corresponding to an amount of a panel load of the display panel 20.

The panel load detection circuit 50 is configured to provide the control signal SW to be provided to the output buffer BUF and the multiplexer MUX.

Namely, the panel load detection circuit 50 may be configured to determine an amount of a panel load of the display panel 20 as one of a heavy load and a light load and provide the control signal SW of a state corresponding to the determination.

Figure 3:
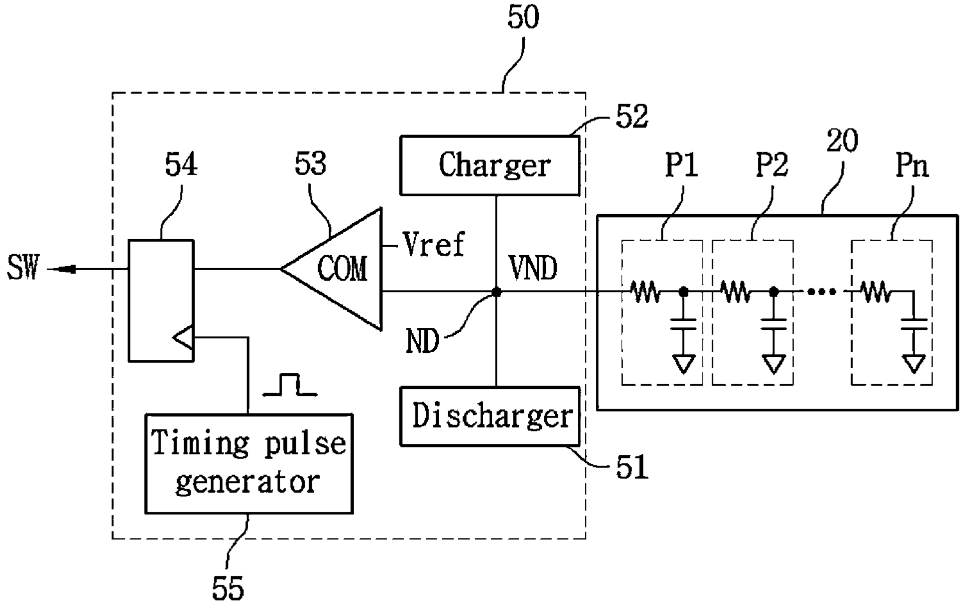
FIG. 3 is a block diagram illustrating an embodiment of a panel load detection circuit for providing a control signal of FIG. 2.

To this end, the panel load detection circuit 50 may be configured as illustrated in FIG. 3.

Referring to FIG. 3, the panel load detection circuit 50 is configured to include a discharger 51, a charger 52, a comparator 53, a timing pulse generator 55 and a panel load determiner 54.

A node ND between the discharger 51 and the charger 52 is connected to the display panel 20. For the sake of convenience in explanation, it is illustrated that the node ND between the discharger 51 and the charger 52 of FIG. 3 is configured to sense an amount of a panel load by being connected to a column line of the display panel 20.

The discharger 51 may perform a discharge to initialize an electrical state of a panel load in order to measure an amount of a panel load of the display panel 20.

The charger 52 is to charge a panel load of the initialized display panel 20 to a preset voltage. The display panel 20 may be charged by charging of the charger 52. A charging level of the display panel 20 may vary depending on an amount of a panel load. When the display panel 20 has a heavy load, a charging level may be formed to be low. Conversely, when the display panel 20 has a light load, a charging level may be formed to be high.

A charging voltage VND of the node ND which is formed by the charger 52 as described above may be provided to the comparator 53.

The comparator 53 may be configured to compare a reference voltage Vref, which is set to have a preset level to distinguish the heavy load and the light load, and the charging voltage VND of the node ND and provide a comparison signal according to a comparison result to the panel load determiner 54.

In the embodiment of the present disclosure, measuring an amount of a panel load of the display panel 20 may be performed at a power-on time point.

To this end, the timing pulse generator 55 is required. The timing pulse generator 55 may be configured to provide a timing pulse having an enable time of a preset period at a preset time point such as a power-on time point. The enable time of the timing pulse may be variously set according to a fabricator's need.

The panel load determiner 54 may be configured to output the control signal SW corresponding to a level of the comparison signal of the comparator 53 outputted during the enable time of the timing pulse. For example, the panel load determiner 54 may be configured using a D flip-flop.

By the configuration of FIG. 3 described above, the panel load detection circuit 50 may determine an amount of a panel load of the display panel 20 after power-on, and may maintain a state of the control signal SW according to the determination till power-off.

Figure 4:
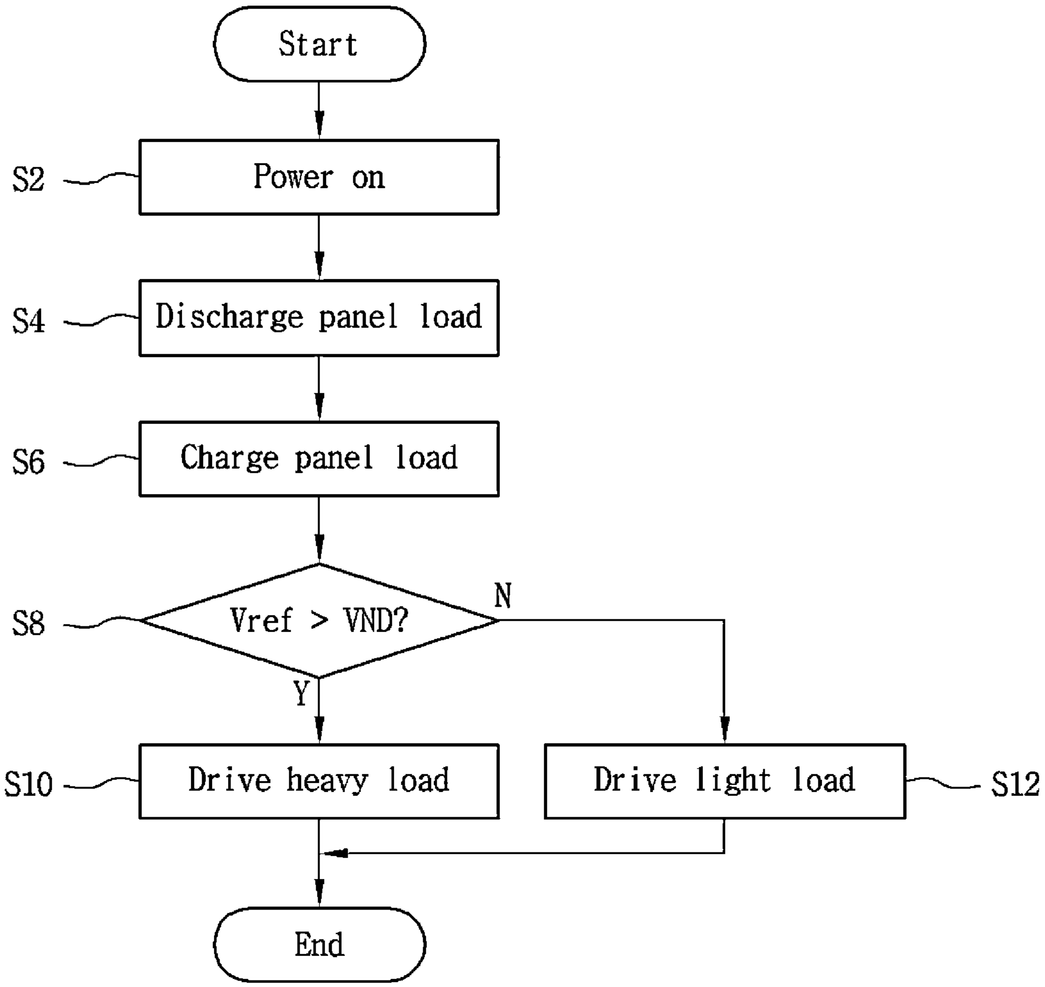
FIG. 4 is a flowchart explaining a method of controlling an amount of current of a source signal depending on an amount of a panel load in accordance with an embodiment.

The embodiments of the present disclosure configured as illustrated in FIGS. 1 to 3 may operate as illustrated in FIG. 4.

When the display system is powered on (S2), the control signal SW for distinguishing a panel load of the display panel 20 as a heavy load or a light load may be generated by the panel load detection circuit 50.

To this end, a panel load of the display panel 20 may be discharged by the discharger 51 (S4), and after an electrical state is initialized by the discharge, a panel load of the display panel 20 may be charged by the charger 52 (S6).

Thereafter, the comparator 53 compares the reference voltage Vref and the charging voltage VND of the node ND which is connected to a panel load of the display panel 20 (S8).

In correspondence to a comparison result of the comparator 53, the panel load determiner 54 may output the control signal SW for driving a heavy load (S10) or output the control signal SW for driving a light load (S12).

When the control signal SW for driving a heavy load is provided, the source signal Sout may be outputted by the first driving circuit 32 and the second driving circuit 34 of the output buffer BUF, and the source signal Sout may be outputted by the selection circuit MUX1 and the current amount control circuit 40 of the multiplexer MUX. At this time, it may be understood that the source signal Sout has an amount of current for driving the display panel 20 of a heavy load.

When the control signal SW for driving a light load is provided, the source signal Sout may be outputted by the first driving circuit 32 of the output buffer BUF, and the source signal Sout may be outputted by the selection circuit MUX1 of the multiplexer MUX. At this time, it may be understood that the source signal Sout has an amount of current for driving the display panel 20 of a light load.

As is apparent from the above description, the embodiments of the present disclosure may control an amount of current of a source signal to be outputted from an output buffer, a source signal to be outputted from a multiplexer to a display panel or a source signal of each of the output buffer and the multiplexer in correspondence to an amount of a panel load of the display panel.

Therefore, the embodiments of the present disclosure may drive the display panel with an amount of current appropriate for an amount of a panel load of the display panel. Thus, the slew rate of a source signal may be improved and the stabilization of a system is possible.

What is claimed is:

1. A display driving apparatus comprising:

an output buffer configured to output a source signal corresponding to display data to a display panel; and a panel load detection circuit configured to determine an amount of a panel load of the display panel to which the source signal is to be provided, and output a control signal corresponding to a level of a comparison signal generated by comparing a charging voltage of the panel load with a preset reference voltage, wherein the output buffer outputs the source signal with an amount of current corresponding to the amount of the panel load, by the control signal.

2. The display driving apparatus according to claim 1, wherein the output buffer includes an output circuit having a plurality of driving circuits which are connected in parallel to an output terminal of the output buffer and operate by output signals driven inside the output buffer, and the output buffer outputs the source signal by using driving circuits whose number is selected by the control signal.

3. The display driving apparatus according to claim 1, wherein the output buffer includes an output circuit having a first driving circuit and a second driving circuit which are connected in parallel to an output terminal of the output buffer and operate by output signals driven inside the output buffer, the second driving circuit is controlled in operation by the control signal, and the output buffer outputs the source signal of the amount of current which is changed according to whether the second driving circuit is operated by the control signal.

4. The display driving apparatus according to claim 1, wherein the output buffer includes:

a first driving circuit and a second driving circuit connected in parallel to an output terminal of the output buffer and sharing output signals; and a switching circuit configured to switch, by the control signal, that the output signals are provided to the second driving circuit, wherein the output buffer outputs the source signal of a first amount of current by the first driving circuit or a second amount of current by the first driving circuit and the second driving circuit.

5. The display driving apparatus according to claim 1, wherein the panel load detection circuit determines the amount of the panel load of the display panel as one of a heavy load and a light load, and provides the control signal of a state corresponding to the determination.

6. The display driving apparatus according to claim 5, wherein the panel load detection circuit determines the amount of the panel load of the display panel after power-on, and maintains the state of the control signal according to the determination till power-off.

7. The display driving apparatus according to claim 1, wherein the panel load detection circuit comprises:

a discharger configured to initialize an electrical state of the panel load of the display panel;

a charger configured to charge the initialized panel load to a preset voltage;

a comparator configured to provide the comparison signal by comparing the charging voltage of the panel load with the preset reference voltage;

a timing pulse generator configured to provide the timing pulse having the enable time of a preset period a panel load determiner configured to output the control signal corresponding to the level of the comparison signal during the enable time of the timing pulse.

8. A display driving apparatus comprising:

an output buffer configured to output a source signal corresponding to display data to a display panel;

a multiplexer configured to control an output path of the source signal; and a panel load detection circuit configured to determine an amount of a panel load of the display panel to which the source signal is to be provided, and provide a control signal, wherein the multiplexer outputs the source signal through the output path to have an amount of current corresponding to the amount of the panel load, by the control signal.

9. The display driving apparatus according to claim 8, wherein the multiplexer comprises:

a selection circuit configured to control the output path of the source signal; and a current amount control circuit configured to control the amount of current of the source signal outputted through the output path, by the control signal.

10. The display driving apparatus according to claim 9, wherein the current amount control circuit includes:

a positive driver and a negative driver configured to each have a preset current driving capacity; and a switching circuit configured to switch, by the control signal, that the positive driver or the negative driver is connected to an output terminal of the selection circuit, wherein the multiplexer outputs the source signal of a first amount of current by the selection circuit or a second amount of current by the selection circuit and the current amount control circuit.

11. The display driving apparatus according to claim 8, wherein the output buffer includes an output circuit having a plurality of driving circuits which are connected in parallel to an output terminal of the output buffer and operate by output signals driven inside the output buffer, and the output buffer outputs the source signal by using driving circuits whose number is selected by the control signal.

12. The display driving apparatus according to claim 8, wherein the output buffer includes an output circuit having a first driving circuit and a second driving circuit which are connected in parallel to an output terminal of the output buffer and operate by output signals driven inside the output buffer, the second driving circuit is controlled in operation by the control signal, and the output buffer outputs the source signal of the amount of current which is changed according to whether the second driving circuit is operated by the control signal.

13. The display driving apparatus according to claim 8, wherein the output buffer includes:

a first driving circuit and a second driving circuit connected in parallel to an output terminal of the output buffer and sharing output signals; and a switching circuit configured to switch, by the control signal, that the output signals are provided to the second driving circuit, wherein the output buffer outputs the source signal of a first amount of current by the first driving circuit or a second amount of current by the first driving circuit and the second driving circuit.

14. The display driving apparatus according to claim 8, wherein the panel load detection circuit determines the amount of the panel load of the display panel as one of a heavy load and a light load, and provides the control signal of a state corresponding to the determination.

15. The display driving apparatus according to claim 14, wherein the panel load detection circuit determines the amount of the panel load of the display panel after power-on, and maintains the state of the control signal according to the determination till power-off.

16. The display driving apparatus according to claim 8, wherein the panel load detection circuit comprises:

a discharger configured to initialize an electrical state of the panel load of the display panel;

a charger configured to charge the initialized panel load to a preset voltage;

a comparator configured to provide a comparison signal by comparing a charging voltage of the panel load with a preset reference voltage;

a timing pulse generator configured to provide a timing pulse having an enable time of a preset period; and a panel load determiner configured to output the control signal corresponding to a level of the comparison signal during the enable time of the timing pulse.

* * * * *